Dec. 20, 1927.

G. A. BURROW

TIRE BOOT

Filed Sept. 1, 1926

1,653,388

Inventor
George A. Burrow
Herbert E. Smith
By
Attorney

Patented Dec. 20, 1927.

1,653,388

UNITED STATES PATENT OFFICE.

GEORGE A. BURROW, OF SPOKANE, WASHINGTON.

TIRE BOOT.

Application filed September 1, 1926. Serial No. 132,975.

My present invention relates to improvements in tire boots, for repairing the inner tubes of tires of automotive vehicle wheels, and the invention is adapted especially for use in connection with low pressure or balloon tires. The improved boot of my invention, while performing the usual functions for a punctured tire-casing, is particularly designed for the purpose of strengthening and reinforcing the inner tube of a low pressure tire against blow-outs, and against puncture from articles or objects passing through the fractures or tears in tire-casings. The boot, which is fashioned of material similar to the material of the inner tube, as soft gum rubber, is provided with reinforcing areas or patches, but practically the same ratio of expansion and contraction of material exists in both the material of the inner tube and of the boot. These characteristics of the material of the tube and boot, assure, when the boot is applied to the tube, that the boot will form a part of the tube and partake of all of its movements. The reinforcing areas or patches within the material of the boot serve to stiffen the latter sufficiently to prevent it being forced by air pressure from within the tube into a crack or puncture in the outer tire casing when a crack or puncture is present.

The boot is fashioned and placed on the market in the form of a longitudinally split tube conforming to the shape of the inner tube and tire casing, and its longitudinally extending edges are formed with overlapping sealing-faces adapted to be sealed together to form a sleeve about the inner tube. These sealing or adhesive faces are protected by removable covers until ready for use, and after removal of these coverings the faces are "cold" sealed.

By the utilization of my invention in the physical embodiment of the tire boot the latter may with facility be manipulated, applied to the inner tube, and sealed on the exterior of the tube with convenience and rapidity, and without the necessity for use of special tools or appliances.

The invention consists in certain novel combinations and arrangements of parts as will hereinafter be more fully set forth and claimed.

In the accompanying drawings I have illustrated one complete example of the physical embodiment of my invention wherein the parts are combined and arranged according to the best mode I have thus far devised for the practical application of the principles of my invention.

Figure 2:
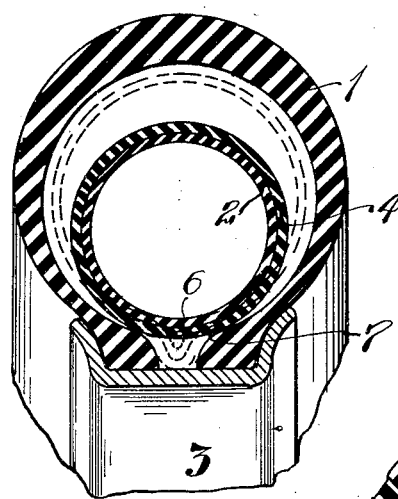
Figure 2 is a transverse sectional view of a tire showing the partially inflated inner tube and a boot thereon within the tire casing.

In order that the general assembly and arrangement of parts may readily be understood I have illustrated a tire casing 1 and inner tube 2 with the rim 3 in Figure 2, the boot being indicated as a whole by the numeral 4 and surrounding the tube in this figure of the drawing.

Figure 1:
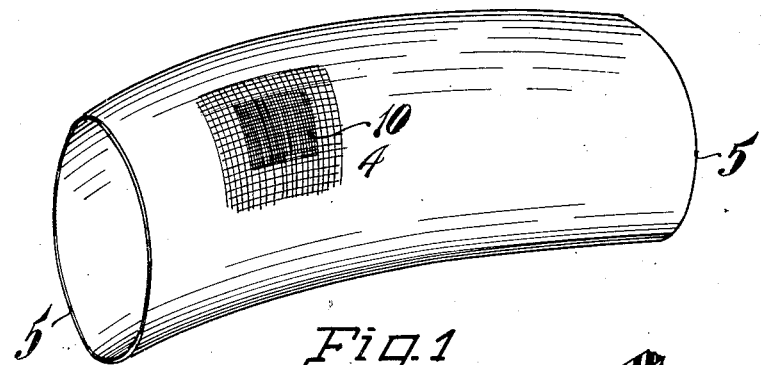
Figure 1 is a perspective view of a tire boot embodying my invention.

The boot may be fashioned from a rectangular sheet of soft rubber or similar material corresponding to the characteristics of the material of which the inner tube is manufactured, and is shaped, as on a mandrel if desired, as a split tube as indicated in Figure 1 with tapered exterior faces at its ends 5 to eliminate wrinkles or shoulders or other irregularities in the tube when the tube and boot are expanded by inflation within the tire casing as indicated by dotted lines in Figure 2.

Figure 4:
Figure 4 is an enlarged detail sectional view showing the adhering faces of the overlapping edges of the boot as in use.

The two edges 6 and 7 of the split tube are adapted to overlap when the boot is placed in operative position on the tube and the complementary faces of these overlapped beveled edges are treated in such manner that they will adhere as a "cold" seal and stick together as indicated in Figure 4. When placed about the inner tube with the outer, beveled, adhering face of the edge 6 in close adhering contact with the complementary inner, beveled, adhering face of the edge 7, these edges of the boot may be "cold" sealed by rubbing against the exterior face of the edge 7 to cause adhesion between the two complementary beveled faces on the boot-edges. After the overlapping edges have been rubbed, or clamped together a short time their complementary faces adhere to form a completed tubular boot about the inner tube.

To protect the adhering faces of the overlapping edges until the boot is ready for use, a removable covering or strip of muslin, linen, or other suitable material is temporarily applied to the adhering faces, as a strip 8 on the exterior face of the edge 6, and a strip 9 on the inner adhesive face of the outer overlapping edge 7 of the boot. These strips 8 and 9 are applied to the soft adhesive faces of the overlapping edges, and of course the exterior faces of the strips are non-adhesive, to prevent sticking together of the edges of the split tube before it is applied to the inner tube as a boot.

Figure 3:
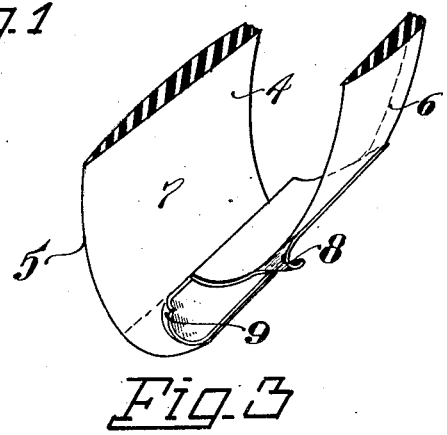
Figure 3 is a detail perspective view showing the removable protecting sheets or coverings for the complementary adhesive faces of the overlapping longitudinally extending edges of the split boot.

The strips stick or adhere lightly to the adhesive faces of the boot-edges and they may therefore be readily pulled from their adhesive faces by first inserting the thumb nail under one corner of the strip, to secure a finger hold as indicated in Figure 3, after which the strip may be pulled and easily separated from the adhesive face. The boot is then immediately applied about the inner tube and its complementary adhesive faces are rubbed or otherwise pressed together to form a sealed joint. In actual practice, the adhesive force between these two faces is so great as to render the joint portion as strong as the remaining body portion of the boot, thus insuring a reinforcing and strengthening repair boot that will support the punctured tube, and render the punctured part of the tube as strong as the imperforate part thereof.

The reinforcing areas or patches for the boot indicated at 10 are preferably cord patches, embedded at various places within the material of the boot during the process of manufacture of the latter. Patches of fabric may also be used, but I find that the cord patches or reinforcing areas serve the purpose of stiffening the material of the boot to render it more durable and to prevent the boot being forced into cracks, fractures or punctures of the tire casing by air pressure from the interior of the tire-tube. Crossed-cord patches cut from old tire casing and embedded in the body of the boot are successfully being used for this purpose.

Having thus fully described my invention, what I claim as new and desire to secure by Letters Patent is—

1. A spilt tubular boot having beveled overlapping edges with complementary adhesive faces for cold-sealing, a removable covering strip for each adhesive face, and reinforcing areas in said boot.

2. A split tubular boot of soft rubber having beveled longitudinal overlapping edges and complementary adhesive faces on said edges, and crossed cord reinforcing-patches interspersed within the body of said boot.

In testimony whereof I affix my signature.

GEORGE A. BURROW.